Sept. 9, 1952     J. H. ANDRESEN, JR     2,609,685

AIRCRAFT INSTRUMENT

Filed Sept. 22, 1944

INVENTOR.
JOHN H. ANDRESEN, JR.
BY
ATTORNEY.

Patented Sept. 9, 1952

2,609,685

UNITED STATES PATENT OFFICE 2,609,685

AIRCRAFT INSTRUMENT

John H. Andresen, Jr., Port Washington, N. Y., assignor, by mesne assignments, to Kollsman Instrument Corporation, Elmhurst, N. Y., a corporation of New York Application September 22, 1944, Serial No. 555,369

1 Claim. (Cl. 73—180)

This invention relates to an aircraft instrument calibrated in air speed and indicating in response to the aircraft angle of attack.

The object of this invention is the provision of such an instrument in which an indication of air speed is given in response to means actuated by the angle of attack of the aircraft.

Another object of the invention is the provision of an aircraft air speed indicator which will indicate a fictitious air speed in response to the aircraft angle of attack so that the relationship of the air speed indicated thereon to the attitude of the aircraft with respect to the relative wind is constant.

Other objects and features of the invention will be readily apparent to those skilled in the art from the specification and appended drawing illustrating a certain preferred embodiment in which.

Figure 1:
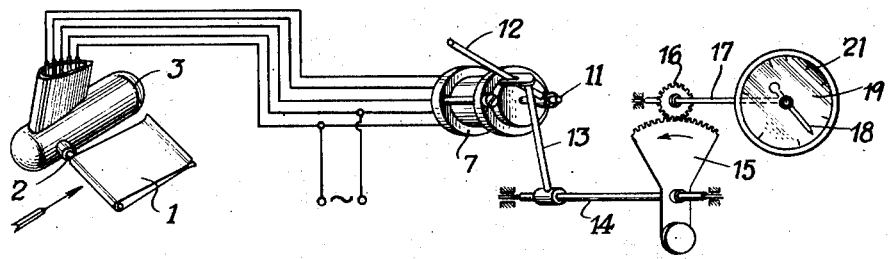
Figure 1 is a diagrammatic representation of an aircraft instrument according to the present invention.
Figure 2:
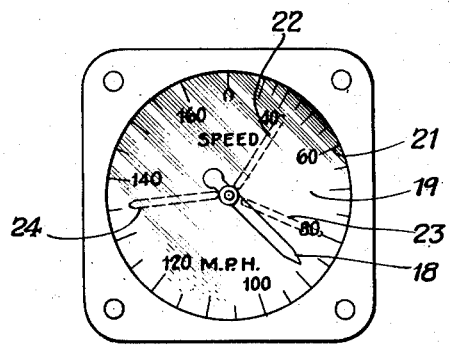
Figure 2 is a front elevational view of the indicating portion of the instrument.
Figure 3:
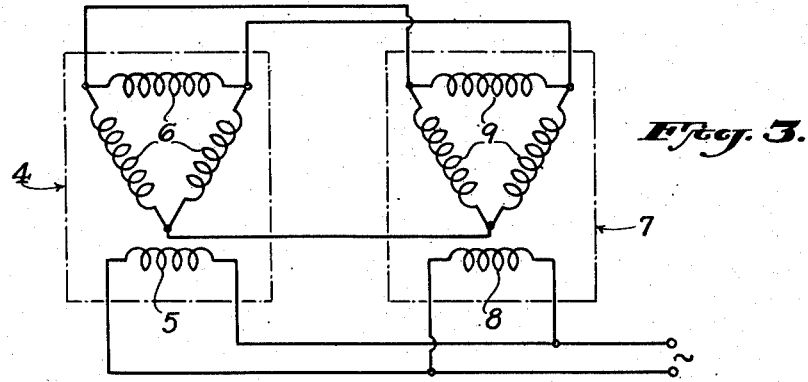
Figure 3 is a wiring diagram of the self-synchronous motor elements of the instrument.

In the instrument of Figure 1, there is provided a vane 1 mounted upon and rotatable with a shaft 2 projecting from a housing 3. The elements 1, 2 and 3 are mounted upon the aircraft so that the vane 1 will be in the path of the relative wind so that the position of the vane will indicate the attitude of the aircraft with respect to the relative wind. Within the housing 3 is disposed a self-synchronous transmitter schematically illustrated within the block 4 of Figure 3. This self-synchronous transmitter is of standard form embodying a rotor winding 5 rotatable by the shaft 2 and a three-phase stator winding 6. The indicating portion of the instrument comprises a similar self-synchronous receiver 7 shown schematically in the wiring diagram of Figure 3 as comprising a rotor winding 8 and a three-phase stator winding 9. The three-phase stator windings 6 and 9 of self-synchronous machines 4 and 7 are interconnected as indicated in the wiring diagram of Figure 3 and the single phase rotor windings 5 and 8 are fed in parallel from an alternating current source. The action of these devices is known and conventional in the art in that a change in the position of the rotor winding 5 will produce a similar angular rotation of the rotor winding 8. The rotor winding 8 is connected to a shaft 11 carrying an actuating arm 12 which is connected to and effects rotation of an arm 13 mounted upon a shaft 14. Also mounted on the shaft 14 for rotation therewith is a sector 15 meshing with a pinion 16 on a shaft 17 which carries an indicating pointer 18 cooperating with the dial 19 bearing indicia 21 of air speed. On the face of the dial 19 are mounted salient marker indications of critical aircraft speeds or attitudes. For example, the salient marker at 22 will indicate the stalling air speed. The salient marker at 23 will indicate the air speed for best lift to drag ratio, and the salient marker at 24 will indicate the maximum safe speed of the aircraft.

The arms 12 and 13 by the change in leverage incident to their angular movements increase the pointer movement at the lower values of angle of attack to produce an expanding of the dial indicia scale in the higher speed range to facilitate reading thereof.

It can be seen that the instrument according to this invention will, under most operating and atmospheric conditions, indicate a fictitious air speed which is really only an indication of the angle of attack of the aircraft or its attitude with respect to the relative wind. However, this has certain desirable features from the standpoint of the indication to the pilot and his reaction thereto. In the operation of standard air speed indicators which are not compensated for altitude and pressure, the indication is also entirely fictitious and a computation must be made to secure correct air speed. Furthermore, even with a fully compensated true air speed indicator, the indication with respect to certain characteristics of the aircraft is misleading to the pilot. For example, in an aircraft which has a stalling speed of 40 miles per hour under standard conditions of load at sea level, the actual stalling speed at different loads, either actual physical load or g-load due to maneuvers, and also its stalling speed under different atmospheric conditions, will vary from the stalling speed under standard conditions. Accordingly, neither the standard indicated air speed indicator nor the compensated true air speed indicator correctly inform the pilot of his approach to a stall. On the other hand, the angle of attack, or the attitude of the aircraft with respect to the relative wind, at which a stall occurs remains relatively constant regardless of load or atmospheric conditions. Accordingly, in the instrument according to the present invention, if the aircraft stalls at an indicated 40 miles per hour under standard conditions, it will also stall at an indicated 40 miles per hour under any other condition of load or atmosphere since the indication of 40 miles per hour represents a definite angle of attack at which stall occurs and which is relatively unaffected by changes in conditions. Therefore, while the instrument gives a fictitious reading as far as navigation is concerned, it will more clearly indicate to the pilot the condition of the aircraft and its speed as related to its operational characteristics.

What has been explained in detail with respect to the indicated stalling speed of the aircraft is also true of the speed for best lift to drag ratio where again, while the indication is fictitious insofar as navigation is concerned, it gives the pilot a clear indication of air speed as it effects the plane's operational characteristics.

While a certain preferred embodiment of the invention has been specifically disclosed, it is understood that the invention is not limited thereto, as many variations will be readily apparent to those skilled in the art and the invention is to be given its broadest possible interpretation within the terms of the following claim.

What is claimed is:

In an aircraft instrument, indicia calibrated in units of air speed, indicating means cooperating with said indicia to indicate a reading thereon, means responsive solely to the angle of attack of the aircraft for effecting relative movement between said indicia and indicating means to indicate a fictitious air speed whose value is determined solely by the angle of attack of the aircraft, and means including a variable lever ratio connection for increasing the relative movement between said indicia and indicating means for a given change in angle of attack as the angle of attack decreases so as to expand the air speed indicia scale in the higher speed ranges.

JOHN H. ANDRESEN, Jr.

REFERENCES CITED

The following references are of record in the file of this patent:

UNITED STATES PATENTS

| Number | Name | Date |
| --- | --- | --- |
| 1,332,810 | Danielson | Mar. 2, 1920 |
| 1,588,178 | Fales | June 8, 1926 |
| 2,246,555 | Underwood | June 24, 1941 |
| 2,361,790 | Noxon | Oct. 31, 1944 |